Feb. 6, 1940. C. D. DANIELS 2,189,728
ROTARY INTERNAL COMBUSTION ENGINE
Filed July 13, 1937 4 Sheets-Sheet 1

Inventor
C. D. Daniels
By Watson E. Coleman
Attorney

Feb. 6, 1940.    C. D. DANIELS    2,189,728
ROTARY INTERNAL COMBUSTION ENGINE
Filed July 13, 1937    4 Sheets-Sheet 2

Inventor
C. D. Daniels
By Watson E. Coleman
Attorney

Feb. 6, 1940. C. D. DANIELS 2,189,728
ROTARY INTERNAL COMBUSTION ENGINE
Filed July 13, 1937 4 Sheets-Sheet 3
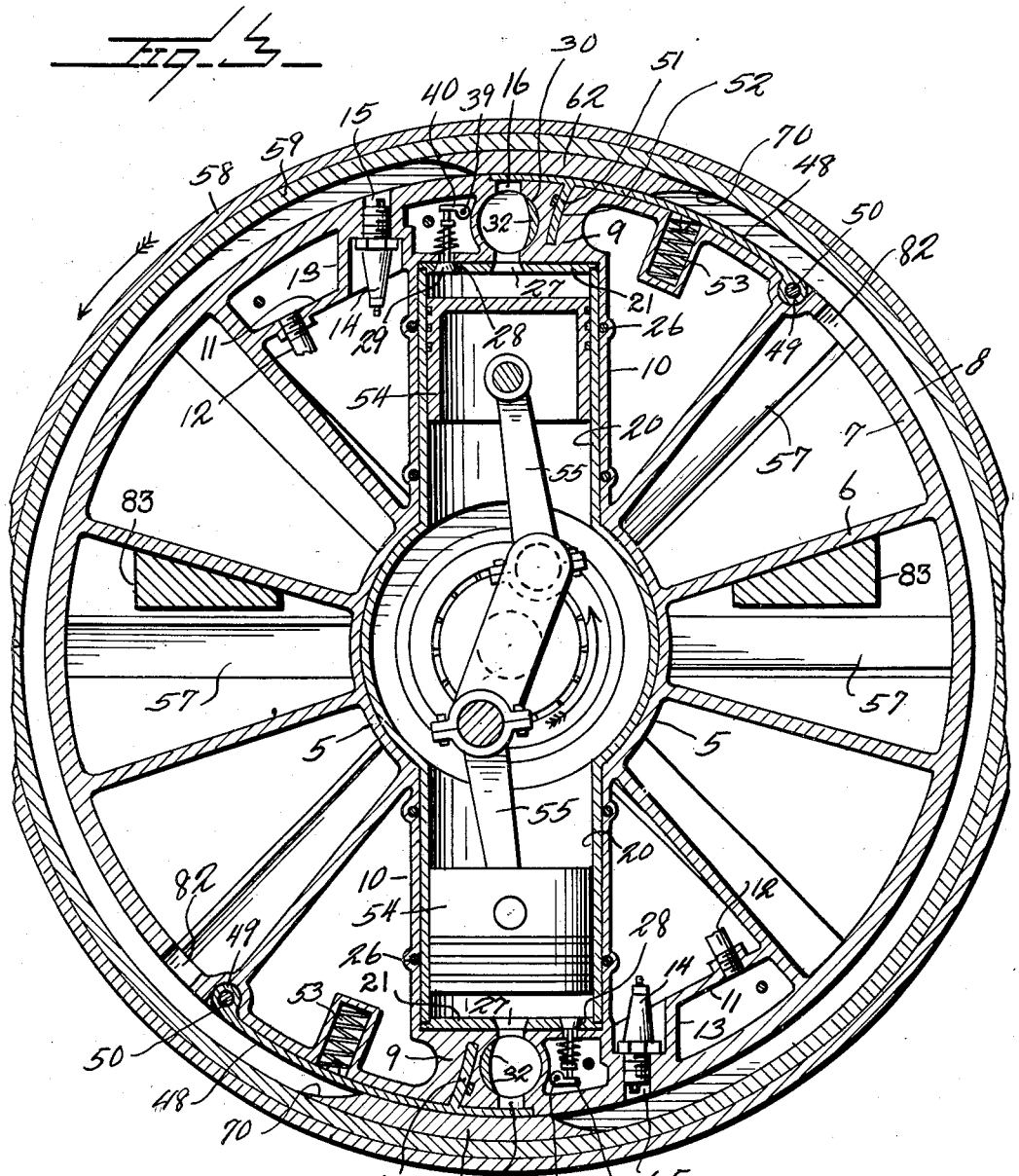
Inventor
C. D. Daniels
By Watson E. Coleman
Attorney Feb. 6, 1940.  C. D. DANIELS  2,189,728
ROTARY INTERNAL COMBUSTION ENGINE
Filed July 13, 1937  4 Sheets-Sheet 4
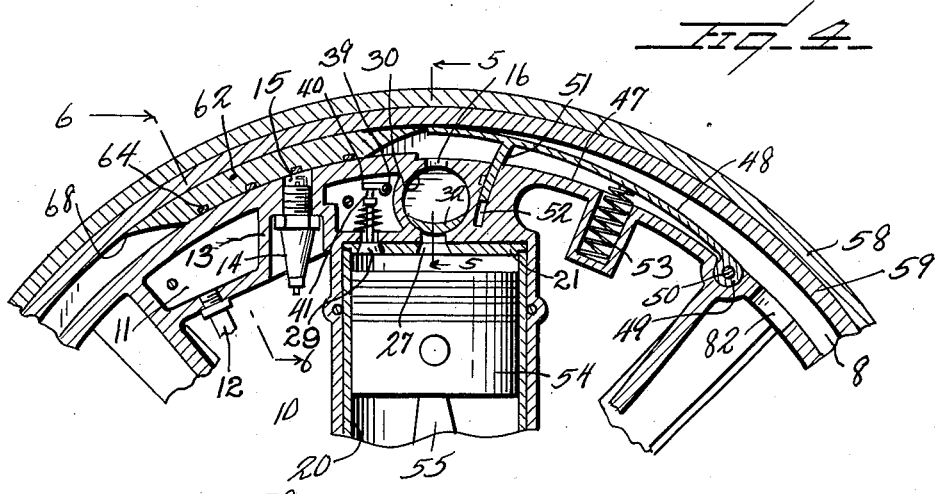
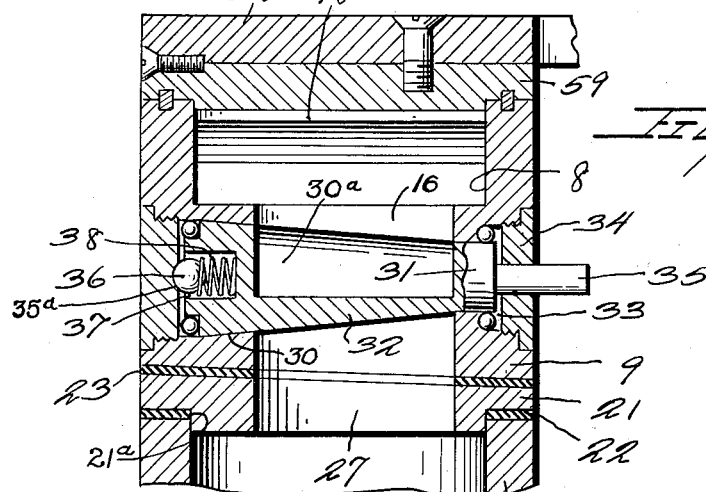
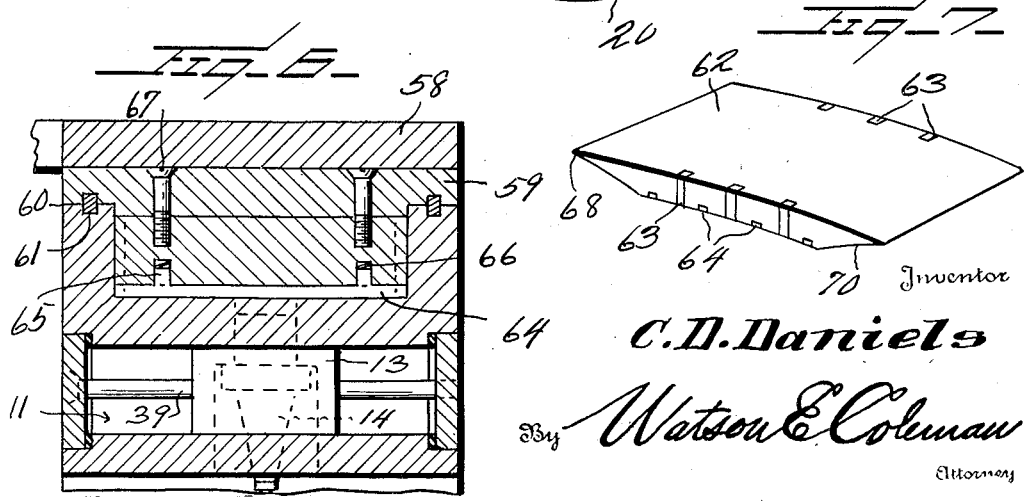
Inventor
C. D. Daniels
By Watson E. Coleman
Attorney Patented Feb. 6, 1940

2,189,728

UNITED STATES PATENT OFFICE 2,189,728

ROTARY INTERNAL COMBUSTION ENGINE

Charles D. Daniels, Mountainair, N. Mex., assignor of one-fourth to Ralph Waldo Lidzey, Mountainair, N. Mex.

Application July 13, 1937, Serial No. 153,453

9 Claims. (Cl. 123—8)

This invention relates to the class of internal combustion engines and more particularly to a rotary two-cycle engine.

The invention has for its primary object to provide a novel two-cycle rotary engine in which an increased production of power can be obtained through the novel arrangement of the parts by means of which the application of the force of the fuel explosion is applied to bodies traveling in an annular path and coupled directly to the engine shaft through the fly wheel of the engine.

Another object of the invention is to provide a novel internal combustion engine of the rotary type wherein the flywheel is coupled with the piston-vane or piston-vanes of the engine which receive the force of the ignited fuel mixture and wherein novel means is provided for keeping down the temperature of the engine by the provision of fan-blades on arms forming a part of the fly wheel structure.

A further object of the invention is to provide in an engine of the character described a novel fuel mixture compressing mechanism and means for transferring the compressed fuel mixture from the compression chamber into the combustion chamber of the engine behind the traveling piston-vane.

A still further object of the invention is to provide in a rotary engine having an annular cylinder and a piston-vane moving continuously in one direction therein, a novel combustion chamber partitioning element forming an abutment wall behind a piston-vane and cooperating therewith to provide a fuel combustion chamber together with novel means forming a part of the abutment for shutting off a fuel inlet passage as the traveling piston-vane is passing over the abutment.

Still another object of the invention is to provide in a rotary internal combustion engine of the character described and having an annular combustion chamber with a fuel mixture compressing means, a novel valve unit interposed between the compressing means and the combustion chamber which is so constructed as to provide an intermediate compressed fuel mixture retaining compartment from which the fuel mixture may be transferred from the compression unit into the combustion chamber behind the piston-vane traveling therein.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Fig. 3 is a sectional view taken on the line 3—3 of Fig. 1.

Fig. 4 is a sectional view through a portion of the engine structure taken on the same plane as Fig. 3 but showing the parts in the position assumed prior to the ignition of a fuel charge in the combustion chamber.

Fig. 5 is a sectional view taken on the line 5—5 of Fig. 4.

Fig. 6 is a sectional view taken on the line 6—6 of Fig. 4.

Fig. 7 is a view in perspective of the piston-vane block.

Fig. 8 is a sectional view taken on the line 8—8 of Fig. 1.

Fig. 9 is a view in perspective of a portion of the fuel inlet valve operating mechanism.

Figure 1:
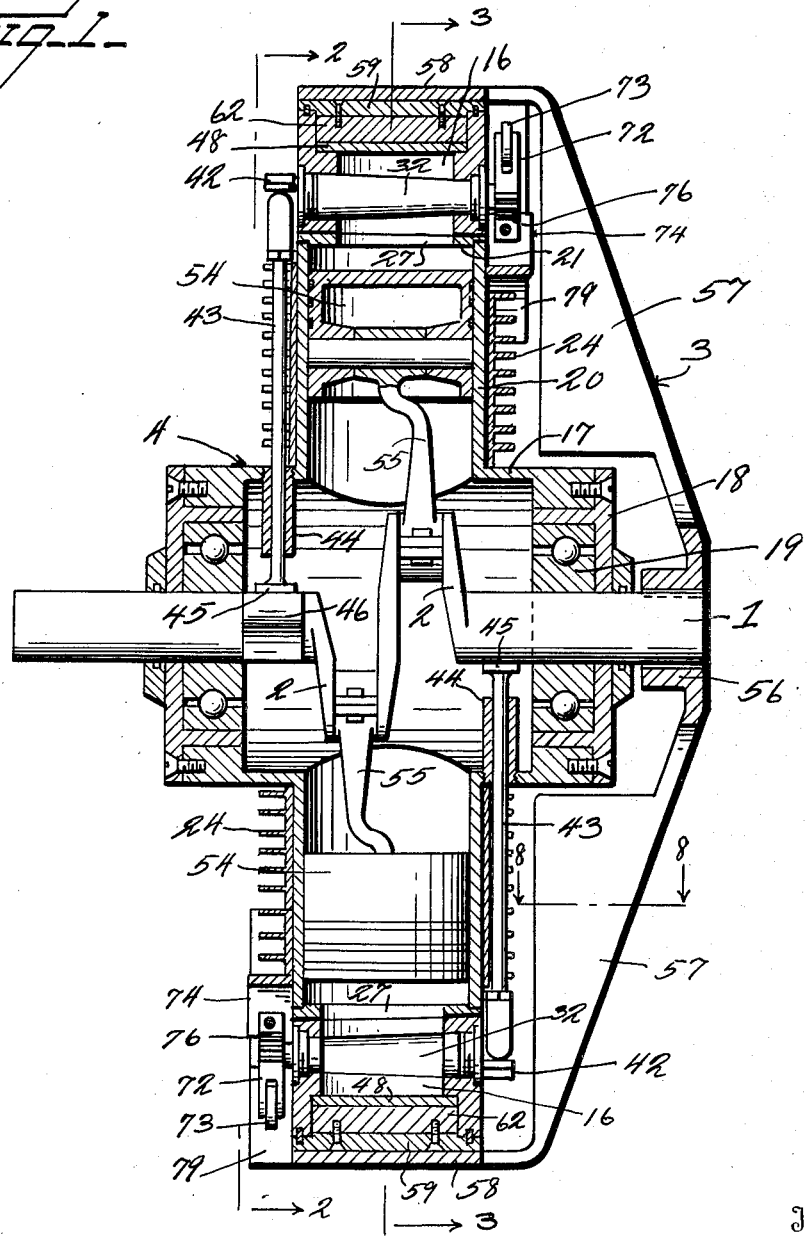
Fig. 1 is a sectional view taken through the center of an engine constructed in accordance with the present invention on a plane paralleling the engine crank shaft.

Referring now more particularly to the drawings wherein like numerals of reference indicate corresponding parts throughout the several views, the numeral 1 indicates the crank shaft of the present engine, the same being shown as having the two cranks 2 which are oppositely disposed or separated at 180° intervals. The numeral 3 generally designates the rotary portion of the engine which is broadly referred to as the flywheel while the numeral 4 generally designates the stationary portion of the structure.

The stationary parts of the engine, by which is meant that portion of the structure which does not rotate around the crank shaft and which has been generally designated by the numeral 4, will first be set forth. This part of the structure comprises a wheel-like unit having the divided hub portion 5 from which extend the radial spokes 6 and the outer or rim portion which is indicated generally by the numeral 7 and which is of substantial thickness and provided in its outer periphery with the continuous channel 8, which constitutes the combustion area, as hereinafter described. At diametrically opposite points, the inner side of the rim 7 is provided with the bodies 9 which may be generally referred to as cylinder blocks and these cylinder blocks are connected with the two portions of the hub 5 by the spaced webs 10 hereinafter referred to as the cylinder webs.

Forming an integral part of each cylinder block is a fuel mixture receiving chamber 11 which has entering through a wall thereof the fuel pipe 12 by means of which the properly carbureted fuel mixture is lead into the chamber 11 from where it passes into the compression cylinders as hereinafter described.

Each of the fuel mixture receiving chambers has a sleeve extending therethrough, as indicated at 13, in which a spark producing device 14 is secured, the electrode carrying end of the device being disposed in the opening 15 which leads into the annular combustion chamber 8 in close proximity to the central part of the cylinder block 9 through which the fuel passageway 16 passes into the chamber 8.

The numeral 17 designates the crank-case or housing for the cranks 2 and this housing is preferably of cylindrical form, as shown in Fig. 1, and has its two ends closed by the plates 18, each of which carries the anti-friction unit 19 through which an end of the crank shaft 1 passes.

Integral with the crank-case 17 and extending radially from diametrically opposite sides thereof are the compression cylinders 20. The crank-case 17 is adapted to be inserted between the two parts of the divided hub 5 with each of the cylinders 20 disposed between a pair of spaced webs 10. Each of the cylinders has its outer end closed by the head 21 and each head is cut out or recessed at 21ª to receive the end of the cylinder and also a gasket 22 which is interposed to prevent leakage of compressed fuel from the cylinder past the head. As shown in Fig. 5, the cylinder head 21 has its top surface cut so that the head will form substantially a wedge between the outer end of the adjacent cylinder and the cylinder block 9 which it opposes and interposed between each cylinder head and the adjacent block 9 is a gasket 23 which also serves to prevent leakage of compressed fuel as the same is being prepared for transfer into the combustion chamber.

Each of the compressor cylinders 20 is covered over the surfaces lying between the webs 10, by flanged or ribbed plates 24. These plates are preferably formed of aluminum or some other suitable metal which will readily take up any heat developed in the cylinder and give it up to the surrounding atmosphere, and they are provided with suitable ears 25 for the reception of bolts 26 which pass transversely of and through the webs 10 so that the plates may be readily drawn into position against the sides of the cylinders. It will also be apparent that by the use of these bolts 26 and the plates 24, the cylinders may be readily forced into position between the webs 10 and between the opposed blocks 9 and that simultaneously with this action, the heads 21 will be firmly forced into position by reason of the inclined formation of their top surfaces which conforms with a similar inclination given to the inner faces of the blocks against which the gaskets 23 press.

Each cylinder head 21 is provided with the compressed fuel mixture outlet passage 27 and with a fuel inlet passage 28 which is tapered in the proper manner to form a seat for a tappet valve 29. The outlet passage 27 of each cylinder head alines with the passage 16 which leads into the chamber 8 and this passage 16 is enlarged intermediate its ends to form the cylindrical chamber 30 which is longitudinally tapered as shown in Fig. 5 to receive the tapered oscillatable valve 31. As shown in Fig. 5, this oscillatable valve is provided with a recess 30ª cut into one side thus leaving at the opposite side the wall portion 32 which is adapted, when in one position, to cover the end of the passage 16 nearest the adjacent cylinder and in another position to lie between the ends and to one side of the passage 16 so as to provide a free path from the cylinder into the combustion chamber 8.

As shown in Fig. 5, the side walls of the bodies 9 in which the oscillatable valves are mounted, are provided with openings 33 leading into the chamber 30 so as to receive the two ends of the oscillatable valve body, and these openings are closed by the plugs 34, one of which is centrally apertured to receive the stem 35 of the oscillatable valve, while the other has a depression 35ª upon its inner face to receive the spring pressed ball 36 which is located within a pocket 37 in the large end of the oscillatable valve and bears against the expansion spring 38 therein. By this construction, the tapered oscillatable valve is normally pressed against the wall of the chamber in which it lies so as to maintain a tight contact therewith. Suitable anti-friction means may be placed around the ends of the oscillatable valves, as illustrated in Fig. 5, to facilitate the easy turning of the same by the mechanism hereinafter described.

Extending transversely through each of the fuel mixture chambers 11, is a rock shaft 39 which carries within the chamber the tappet 40 which bears against the end of the stem 41 of the adjacent tappet valve 29. Exteriorly of the fuel chamber, the rock shaft 39 carries the outside tappet 42 with which is engaged the outer end of the tappet rod 43 which extends radially inwardly through the guide 44 carried by the crank housing. At the inner end the tappet rod 43 has a foot 45 which bears against the cam 46 which forms a part of or is carried by the engine crank shaft 1.

Upon the opposite side of each fuel inlet passage 16 from the adjacent firing device or spark plug 14, the inner or bottom wall of the combustion passage or chamber 8 is cut out or recessed as indicated at 47 to receive the swinging abutment valve 48. This valve, as is shown in Figs. 3 and 4, is in the form of an elongated curved plate which has a width equal to the width of the recess or passage 8. The seat recess 47 in which the valve 48 positions, extends across the fuel inlet passage 16 and at its opposite end it is cut out, as clearly shown in Fig. 4, to receive the hinge sleeve 49 which is formed transversely of the end of the abutment valve body and this hinge sleeve is retained in position by the hinge pin 50. The abutment valve extends the full length of the seat 47 and formed integral with the valve upon the underface thereof is a relatively wide rib 51 which constitutes an abutment wall, as hereinafter described. This abutment wall is received in a similarly formed slot 52 in the adjacent cylinder block 9, and the portion of the abutment valve between the abutment wall and the adjacent end of the valve constitutes a closure lip which, when the valve is seated, overlies and closes the outer end of the passage 16. This position of the abutment valve is illustrated in Fig. 3 while it is shown in its opposite position in Fig. 4.

Beneath each abutment valve between the hinged end thereof and the abutment wall 51, is a spring 53, shown as seated in a socket in the bottom of the channel 8 which normally urges the valve to its outwardly moved position, which will hereinafter be referred to as its open position, as when it is so disposed in the passage or chamber 8, the forward or lip end has uncovered or opened the outer end of the passage 16 to permit a fuel charge to pass from within the oscillatable valve 31 to that portion of the combustion chamber 8 lying between the abutment wall 51 and the piston-vane hereinafter described.

The numeral 54 designates the compressor pistons which are joined by the connecting rods 55 with the cranks 2 of the shaft.

Referring now to the rotary part of the mechanism which is generally designated by the numeral 3, this consists of a hub 56 which is keyed, as shown in Fig. 1, to an end of the shaft 1 and has extending radially from it the integral blade arms 57 which are relatively wide and which are obliquely disposed relative to the axis of the shaft, as shown in Fig. 8, to provide in addition to their function of carrying arms for the mechanism hereinafter described, a means for creating a circulation of air about the cylinders and cylinder casings and about the rim portion of the engine in the channel 8 of which the hereinafter described piston-vane moves.

The outer ends of the blade arms 57 of the flywheel or rotating unit are connected with the flywheel annulus 58 which is of the same width as the rim 7 and encircles but is spaced from the same.

Interposed between the annulus 58 and the outer edges of the side walls of the channel 8 is the annular band 59 which is secured, as shown in Fig. 5, to the flywheel annulus 58 and which is provided around its inner surface and adjacent each side edge with the groove 60 to receive the adjacent edge of the rim in which the chamber or piston-vane channel is formed. The peripheral surfaces of the rim 7 bordering the combustion chamber 8 are suitably recessed together with the opposing surfaces of the band 59, to receive the rings 61 which form a seal between these surfaces and thus prevent the escape of power developed from the ignition of a combustible fuel charge.

Fig. 7 illustrates the piston-vane which fits in the combustion chamber or recess 8 and is propelled through the same under the force of power developed by the ignited fuel mixture thus corresponding with the usual piston of a standard internal combustion engine. This piston-vane is generally designated 62, and in addition to having the packing strips countersunk transversely in its side edges, as indicated at 63, it has countersunk in its inner surface the transversely disposed compression bars 64 which, as shown in Fig. 6, have fingers 65 inserted into recesses in the piston-vane and engaging springs 66 in such recesses which normally tend to urge the compression bars outwardly and into contact with the opposing bottom surface of the channel 8. These piston-vanes 62 are secured, as shown in Fig. 6, by screws 67 or by any other suitable means, to the band 59 which closes the outer side of the annular chamber 8 through which the piston-vanes slide.

The forward end of each piston-vane is tapered off to form the sharpened advancing edge, as indicated at 68, while the rear edge is tapered off to form the curved undersurface 70. By providing the advancing edge of the piston-vane with the tapered surface, the piston-vane will ride smoothly onto the abutment valve 48 and thus lower or depress the same smoothly and after it has passed over the abutment valve, the tapered rear or trailing portion 70 will permit the free end of this valve to swing outwardly to opened position smoothly instead of snapping out as would be the case if the trailing end of the piston-vane were cut off square.

Figure 2:
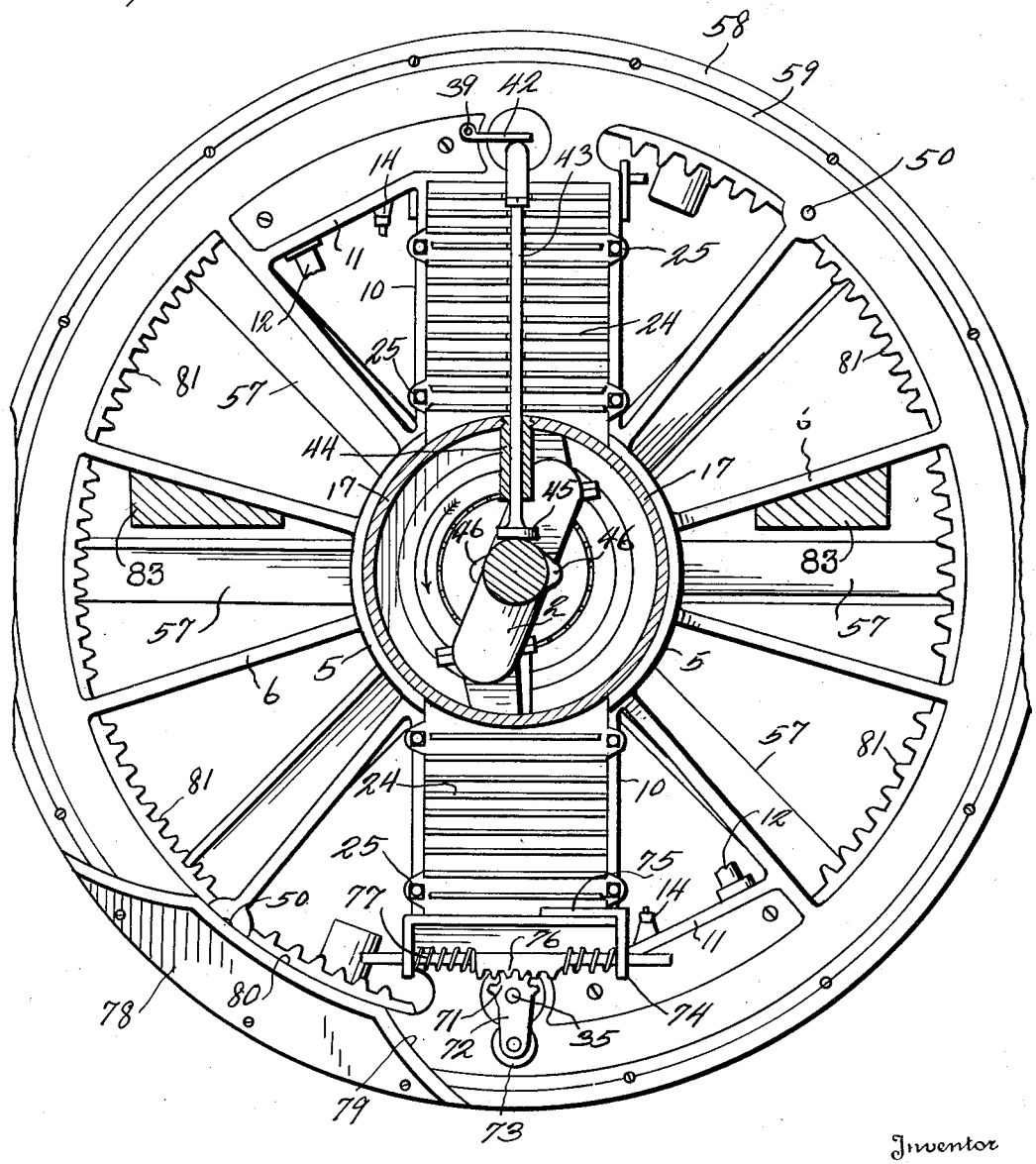
Fig. 2 is a sectional view taken on the line 2—2 of Fig. 1.

The operating mechanism for the oscillatable valve 31 is disposed upon the outer side of the engine structure at the end of the oscillatable valve from which the stem 35 extends. As shown in Fig. 2, the stem 35 has secured thereto the toothed segment 71 which has the integral arm 72 extending therefrom which carries a roller 73. Secured across the adjacent end of the cylinder between the arms 74 of a bracket 75, which is attached to the cylinder, is a toothed rack 76 with which the teeth of the segment 71 engage and the ends of this rack are smooth or free of teeth so as to slide freely through suitable apertures in the spaced arms 74 of the bracket and interposed between these arms and the ends of the toothed portion are springs 77 which are in opposed relation and constantly tend to center the rack and thus restore the oscillatable valve 32 to its normally open position.

The arm 72 is oscillated to oscillate the adjacent valve as desired, by the cam plate 78, which is secured to the adjacent edge of the band 59. This cam plate has the inclined end cam surfaces 79 and the intermediate cam surface 80 which is directed toward the center of the engine and thus as the cam plate rotates with the flywheel unit 3, the advancing inclined camming surface 79 will contact a roller 73 and oscillate the gear segment to shift the rack 76 and thus turn the adjacent oscillatable valve 32 to its closed position. As the contacted roller rides off of the cam plate at the opposite end, these springs 77 will restore the oscillatable valve to its former opened position.

The numeral 81 indicates a toothed or ribbed plate disposed between each pair of spokes 6. These ribbed plates being in contact with the inner side of the piston-vane or combustion chamber, and being preferably formed of aluminum, will take up heat from the combustion chamber and because of the large surface area provided by the teeth, will rapidly dissipate the absorbed heat. This action will be accelerated by the action of the blade arms 57 of the flywheel which creates a current of air transversely of the compressor cylinders.

In operation fuel mixture after being properly carbureted, is furnished to the chambers 11 through the pipes 12 so that when the cams 46 operate to depress the inner tappet fingers 42 to open the valves 29, the pistons 54 moving inwardly toward the center of the machine will draw in a fuel charge. These pistons are, of course, operated by the power transmitted to the crank shaft 1 through a previous explosion of gases in the combustion chamber 8 behind the piston-vanes 62, and it will be understood that during this intake of the fuel charge into the compression cylinders 20, the oscillatable valves 32 will be in the closed position shown in Fig. 4 and the piston-vanes 62 will be moving toward a gate valve 48. During this movement of the piston-vanes, while the gate valves are in the opened position in which the valve 48 is shown in Fig. 4, each piston-vane will be pushing ahead of it the spent gases of a former explosion to discharge the same through the exhaust ports 82 which are formed in the bottom of the channel 8 at the rear of the gate valves 48.

Upon the upstroke of the compressor pistons, the intaken fuel charge will be compressed, the tappet valve 28 having been closed and the oscillatable valves still being in the closed position. As the piston-vanes 62 ride onto their respective gate valves 48, the latter will be forced down into closed position where the forward ends will overlie and close the outlet ends of the fuel passages 16 and the oscillatable valves will then be actuated into the open position shown in Fig. 3, so that the compressed fuel charge will move into the cut out central portion of the oscillatable valve and the compressor pistons will continue to move outwardly to maintain the proper compression of the mixture.

As the piston-vanes pass over the free ends of the gate valves 48 permitting the latter to rise to open position, the fuel charge within the oscillatable valves will pass into the area between the adjacent piston-vane and the adjacent abutment wall 51 and as the compressor pistons reach the limit of their compression strokes, the oscillatable valves will be turned to the closed position shown in Fig. 4, and by this time the piston-vanes will have moved to positions where the adjacent spark-plugs will be exposed and by suitable mechanism (not shown) the necessary igniting spark will be created to set off the fuel mixture, and this will result in driving the piston-vane on in the manner described.

It will be noted that the compressor pistons and the piston-vanes are opposed and operate simultaneously, so that a power impulse will be imparted to the crank shaft 1 through the medium of the piston-vanes 62 connected at diametrically opposite sides of the same and thus the shaft will be driven smoothly. While only two piston-vanes and two compressor units have been shown, it is to be understood that an increased number of these groups may be employed as, for example, an engine may be constructed having two or four pairs of compressor units and piston-vanes as well as the one pair illustrated.

It will also be apparent that it will be possible to ignite the fuel mixture in the top of the compressor cylinders and then at the same time open the oscillatable valve so as to allow the ignited fuel charge to pass out through the valve and exert its pressure between the gate valve and the piston-vane while the oscillatable valve closes behind the fire as the compressor piston passes over its center and starts back upon a fuel intake stroke. It will be noted that one of the several novel features of this motor resides in the fact that when the fuel mixture or gas is fired, one wall of the combustion chamber moves with and in the direction of the piston-vanes or the body moving through the combustion chamber against which the force of the explosion is applied so that a great deal more energy will be obtained than is obtained in the type of engine where the explosion driven piston is the only part which moves under the urge of the pressure created.

It is to be understood also that whereas the combustion chamber 8 has been illustrated and described as being of rectangular cross-section, this feature is not obligatory as the chamber may be oblong or it may be of circular or partially circular cross-section and also, while the particular construction has not been illustrated because of the fact that linings in such combustion chambers have been previously used, it is to be understood that the combustion chamber through which the piston-vanes move may have replaceable linings designed to take the wear created by the movement of the piston-vanes therethrough.

No specific means has been illustrated for supporting or mounting the stationary part of the present engine. There are shown, however, two bracket arms 83, Figs. 2 and 3, which may be attached in any suitable manner to or may form an integral part of any suitable supporting standard (not shown). These bracket arms 83 are coupled with the spokes 6 which form a part of the stationary portion of the engine and they extend laterally therefrom on the side of the engine opposite from the flywheel arms or blades 57.

What is claimed is:

1. An internal combustion engine of the character described, comprising a crank casing, a crank shaft extending through said casing, the shaft having cranks within the casing and having ends projecting through opposite walls of the same, a pair of diametrically oppositely arranged radially extending compressor cylinders connected with the casing, a piston in each of said cylinders operatively coupled with a crank of said shaft, means forming a continuous annular combustion chamber encircling the casing and cylinders and arranged concentrically with the shaft, a pair of piston-vanes arranged at opposite points in said combustion chamber, means for partitioning said combustion chamber at timed intervals relative to the piston-vanes, means for introducing fuel into said cylinders to be compressed by the pistons therein, valve controlled means for transferring compressed fuel from the outer end of each cylinder directly longitudinally of the cylinder into the combustion chamber between the partitioning means and an adjacent piston-vane, means for igniting the introduced fuel mixture and for exhausting the products of combustion therefrom, and means coupling the piston-vanes with the crank shaft whereby the power movement imparted to the vanes will be transmitted to the shaft.

2. An internal combustion engine of the character described, comprising a stationary body consisting of a hub portion, spokes radiating from the hub and a rim encircling the hub and connected thereto by said spokes, said rim having a continuous peripheral passage in its outer surface, a pair of compressor units disposed within the area defined by said rim between the latter and the hub and each including a cylinder and piston, the cylinders extending radially from the hub and terminating adjacent the rim, a crank shaft extending through and coaxially with the hub and operatively coupled with said pistons to move the same radially outward simultaneously, a fly wheel secured to the shaft, a band encircling the rim and closing the outer side of said passage and operatively coupled with the fly wheel to rotate therewith, piston-vanes attached to said band and movable in said peripheral passage, the said vanes being diametrically oppositely disposed to simultaneously position across the outer ends of said cylinders, means for partitioning said passage at timed intervals relative to the movable vanes and adjacent the outer ends of the cylinders, valve controlled means for transmitting compressed fuel from the cylinders simultaneously radially outwardly to the passage directly from the outer end of the cylinder between the partitioning means and the vanes, and means for igniting the fuel mixture introduced between the movable bodies and the partitioning means and for subsequently exhausting the products of combustion resulting from such ignition.

3. A rotary engine, comprising an annular body having a continuous peripheral passage extending throughout its circumference, a shaft extending axially through the annular body, means for supporting the body on the shaft, a pair of blocks mounted upon the inner side of the annular body at diametrically opposite points and each having a fuel passageway leading therethrough radially of the body into said peripheral passage, an oscillatory valve in and controlling the passage of fuel through said passageway, a fly wheel secured upon the shaft at one side of the annular body, an annular band coupled with the fly wheel and encircling the annular body and overlying and closing said passage, a pair of piston vanes slidably disposed in the passage and secured at diametrically opposite points to said band, an abutment valve adjacent each fuel passage and movable to a position to close said peripheral passage, means for timing the closing of the peripheral passage by the abutment valves when a piston vane is disposed at the opposite side of the adjacent fuel passageway from the abutment valve, means for opening said oscillatory valve for the introduction of compressed fuel between the abutment valve and the vane and subsequently shutting the oscillatory valve, and means for igniting said introduced fuel mixture following shutting of the oscillatory valve and for subsequently discharging the products of combustion from the peripheral passage.

4. A rotary engine, comprising an annular body having a continuous peripheral passage extending throughout its circumference, a shaft extending axially through the annular body, means for supporting the body on the shaft, a pair of blocks mounted upon the inner side of the annular body at diametrically opposite points and each having a fuel passageway leading therethrough radially of the body into said peripheral passage, an oscillatory valve in and controlling the passage of fuel through said passageway, a fly wheel secured upon the shaft at one side of the annular body, an annular band coupled with the fly wheel and encircling the annular body and overlying and closing said passage, a pair of piston vanes slidably disposed in the passage and secured at diametrically opposite points to said band, an abutment valve adjacent each fuel passage and movable to a position to close said peripheral passage, means for timing the closing of the peripheral passage by the abutment valves when a vane is disposed at the opposite side of a fuel passageway from an abutment valve, means for opening said oscillatory valve for the introduction of compressed fuel between the abutment valve and the vane and subsequently shutting the oscillatory valve, and means for igniting said introduced fuel mixture following shutting of the oscillatory valve and for subsequently discharging the products of combustion from the peripheral passage, said abutment valve including an extension lip adapted to lie across and close said fuel passageway when a vane is moving past the abutment valve in the peripheral passage.

5. An internal combustion engine of the character described, comprising an annular body having a continuous encircling peripheral passage constituting a combustion chamber, a shaft extending axially through said annular body, means connecting the body with the shaft for the support of the body thereon, a pair of fuel mixture receiving chambers disposed at diametrically opposite points on the inner side of the annular body, a pair of compressor units each being disposed adjacent a chamber and adapted to receive fuel mixture therefrom for compression, a valve controlled passageway leading from each compressor unit radially of the body into the annular passageway, said compressor units being operatively coupled with said shaft to be actuated thereby, an annular band encircling the annular body and overlying and closing said peripheral passage, means coupling the annular band with said shaft for rotation therewith, an abutment valve oscillatably mounted in the annular passage adjacent each fuel passageway and movable outwardly to partition the passage at one side of said fuel passageway, a pair of piston vanes carried by said band snugly fitting in and movable through the annular passage, means for moving said abutment valves to partitioning position after a vane has passed thereover, means for effecting the timed opening and closing of the valves of said valve controlled passageway after a vane has passed across the same and over an abutment valve to admit compressed fuel between the gate valve and the vane, means for igniting the introduced compressed fuel mixture, and means for exhausting the products of combustion following ignition of the mixture.

6. In a rotary engine, a stationary body having a continuous annular combustion chamber, a band encircling and forming an outer wall of the combustion chamber and movable concentrically about the chamber, a shaft extending through the body axially of said chamber, a pair of diametrically oppositely related fuel inlet passages opening through the bottom of the annular chamber, means for supplying fuel under compression to the inlet end of each passage, a valve oscillatable on an axis extending across said fuel passage and controlling the flow of compressed fuel therethrough, an oscillatable abutment valve countersunk in the bottom of the combustion chamber adjacent each fuel inlet passage and carrying a partitioning wall which moves with the abutment valve to a position transversely of the chamber, a pair of piston vanes each secured at diametrically opposite points to said band for movement continuously through the chamber, each of said vanes being formed to ride over and depress the abutment valves, means for raising each abutment valve to partitioning position after the passage of a piston vane past the same and past the adjacent fuel inlet passage, means for opening and subsequently closing the fuel passage valve immediately following the passage of a vane therepast to introduce compressed fuel mixture between the vane and the adjacent partitioning means, means for igniting compressed fuel mixture introduced between the vanes and partitioning means, means for exhausting products of combustion from the combustion chamber and arms coupling said piston vane carrying band with the shaft whereby the vanes, band and shaft will rotate relative to the said body.

7. A rotary engine, comprising a stationary structure consisting of a divided hub, spokes radiating from the divisions thereof and an annular rim concentric with the hub and connecting the spokes, a pair of blocks integral with the inner side of the rim and at diametrically opposite points thereon, a pair of spaced webs extending from each block radially inwardly and each connected with a division of the hub, a cylindrical crank case, a pair of piston cylinders integral with and extending radially from diametrically opposite sides of said case, said crank case being inserted between said hub divisions and each cylinder being inserted between a pair of webs with an outer end opposing a block, a combustion chamber formed in and encircling the periphery of said rim, a valved fuel passage leading through each block from within a cylinder into said channel, a crank shaft extending axially through said casing, pistons in the cylinders coupled with the crank shaft, means for admitting fuel into the head end of each cylinder, a band encircling said rim and constituting a movable outer wall for said chamber, means coupling the band with the shaft for rotation therewith, a pair of piston vanes within the chamber coupled at diametrically opposite points with the band, means within the chamber adjacent each fuel passageway for partitioning the chamber relative to a vane, the vanes being adapted to pass over the said means, mechanism operating to open and close the valved passageways to admit compressed fuel into the chamber between a vane and partitioning means, exhaust means for the chamber for the removal of products of combustion therefrom, and means for igniting the fuel admitted between the vane and partitioning means.

8. A rotary internal combustion engine, comprising a wheel-like stator having a hub portion, spokes radiating therefrom and a rim portion connecting the spokes, said rim having an outwardly opening continuous circumferential channel, a pair of compressor cylinders radiating from opposite sides of said hub, a shaft passing through the hub and having a crank therein for each cylinder, a piston in each cylinder operatively connected with a crank, each cylinder terminating at its outer end in close proximity to the rim, a fuel passageway leading from the outer end of each cylinder through the bottom of said channel, an oscillatable valve extending across and controlling each passageway, a rotary band encircling the rim and closing the channel and coupled with said shaft to turn therewith, a piston-vane for each cylinder attached to the band and fitting snugly in the channel, means at one side of each passageway normally positioning the channel and adapted to be depressed by the vanes to permit passage thereof, control mechanism for the oscillatable valves which is so constructed and arranged that the valves will be turned from closed position to open the passageways while the vanes are moving across the passageways and closed after the vanes have cleared the passageways and fuel charges have entered the areas between the vanes and the channel partitioning means, means for igniting the charges in said areas, and means for exhausting the products of combustion from the channel.

9. A rotary engine, comprising a stationary structure consisting of an annular rim, a two-part hub disposed centrally of said rim, a plurality of spokes extending radially from the hub parts to the rim, a pair of block members integral with the inner side of the rim and at diametrically opposite points thereon and each having its inner face directed toward the divisions between the hub parts, a pair of webs extending in spaced parallel relation from each block and each joining one of said hub parts, a cylindrical crank case, a pair of piston cylinders integral with and extending radially from diametrically opposite sides of said case, said crank case being inserted between said hub divisions and each cylinder being inserted between a pair of webs with an outer end opposing a block, a wedge-shaped head covering the outer end of each cylinder and contacting the inner face of the adjacent block, said wedge heads forming wedge connections between the cylinders and blocks when the cylinders are moved between the webs, a continuous annular combustion passage formed around the periphery of said rim, an annulus encircling the rim and covering said passage, a shaft passing through said hub and carrying crank arms coupling with pistons movable in said cylinders, said shaft being coupled with said annulus to rotate therewith, piston-vanes carried by the annulus and moving in the passage, a valved passage leading through each block from a cylinder into the first passage, partitioning means operating synchronously with the vanes and annulus to close the first passage at one side of the second-mentioned passage when a vane is arranged at the opposite side of the second passage from the partition means, timing mechanism for opening and closing said valved passages synchronously with the positioning of the vanes and partitioning valves as described, means for igniting a fuel charge in the first passage between the vanes and the partitioning valves, and means for exhausting the products of combustion from the combustion passage.

CHARLES D. DANIELS.